United States Patent [19]

Lackey

[11] 4,100,316
[45] Jul. 11, 1978

[54] FORM FOR DECORATIVE WREATH

[76] Inventor: Laurie M. Lackey, 6825 Beechtree La., Falls Church, Va. 22042

[21] Appl. No.: 815,643

[22] Filed: Jul. 14, 1977

[51] Int. Cl.² ............................................... A41G 1/00
[52] U.S. Cl. .......................................... 428/10; 24/5; 24/17 B; 248/27.8; 428/65
[58] Field of Search ...................... 24/5, 6, 17 B, 85 R, 24/252 A; 47/41.12, 41.13; 206/423, 805; 248/27.8; 240/10 N; 428/10, 21, 65, 230, 231; 426/104, 132

[56] References Cited

U.S. PATENT DOCUMENTS

| 1,482,537 | 2/1924 | Alter et al. | 428/10 |
| 2,499,740 | 3/1950 | Glance | 428/10 X |
| 2,591,016 | 4/1952 | Schoenherr | 428/11 X |
| 3,000,074 | 9/1961 | Butkiewicz | 428/4 X |
| 3,370,779 | 2/1968 | Cole | 428/4 X |
| 3,546,050 | 12/1970 | Vanden Bush | 428/10 X |

FOREIGN PATENT DOCUMENTS

| 242,429 | 9/1965 | Austria | 47/41.13 |
| 1,027,038 | 2/1952 | France | 428/21 |
| 17,787 | 10/1956 | Fed. Rep. of Germany | 428/21 |

Primary Examiner—George F. Lesmes
Assistant Examiner—Henry F. Epstein
Attorney, Agent, or Firm—Crickenberger & Moore

[57] ABSTRACT

A wreath form comprises an annular disc having a spirally-wrapped elastic band extending around the entire outer surface area to hold decorative objects in position on the annular disc. Holes are provided in the disc to receive nails to project therethrough. A second and similar structure is fastened in spaced relationship to the annular disc structure when an enlarged wreath is desired.

2 Claims, 3 Drawing Figures

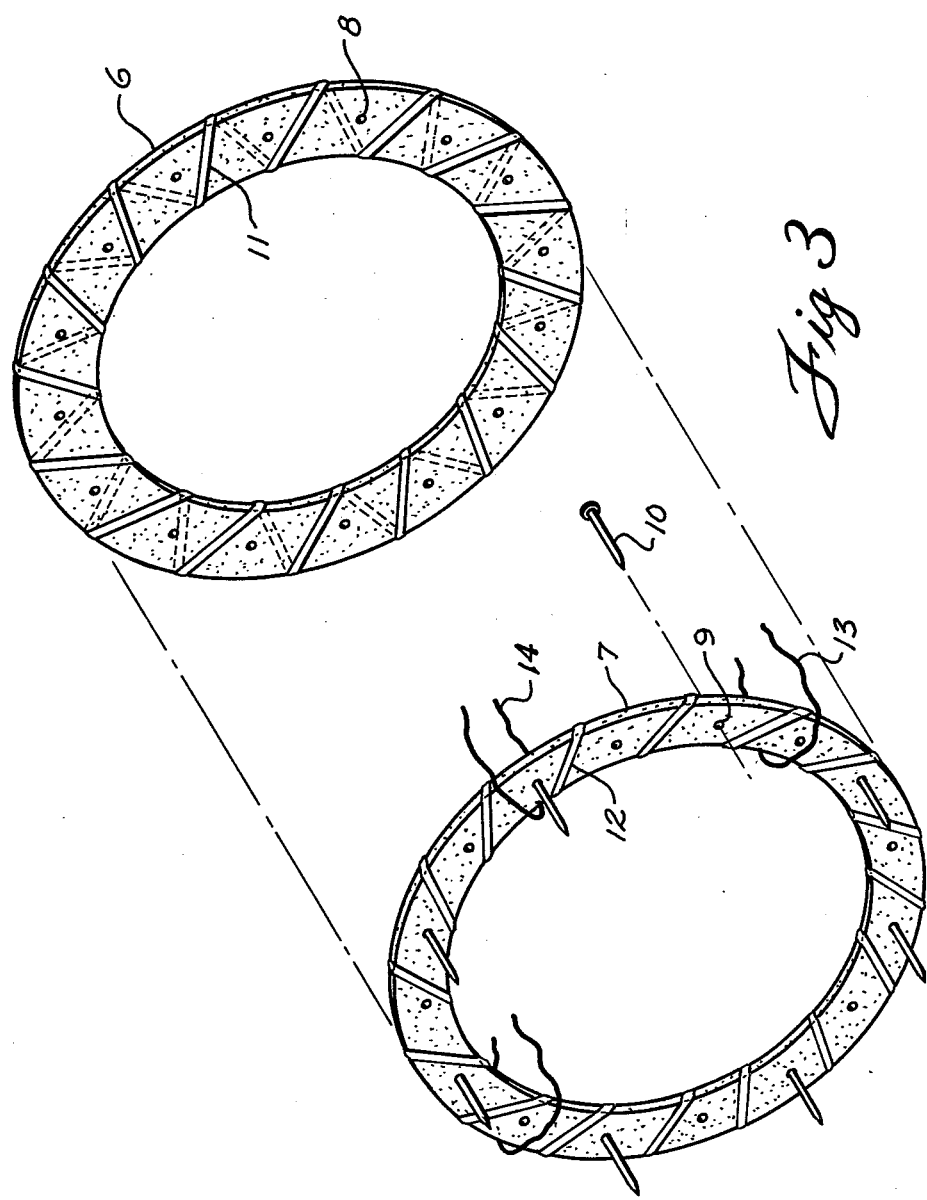

FORM FOR DECORATIVE WREATH

BACKGROUND OF THE INVENTION

The Christmas holiday season inspires in many people the urge to create decorative and fancy ornaments to hang about on doors, windows and Christmas trees. It is a particularly popular passtime to make decorative wreaths from branches of evergreen trees and display the wreaths in windows and on doors. The construction of such wreaths requires considerable manual dexterity and a generous supply of flexible branches to permit the intricate bending and tying normally required in the construction of a wreath. For many people, the skill and effort required is such that the project is frequently not undertaken, or is abandoned in frustration. An object of this invention is to provide a simple structure to serve as a base for a decorative wreath which can be made with little skill and effort by utilizing readily available raw materials.

SUMMARY OF THE INVENTION

The present invention provides a form or base for a decorative wreath which may be used to construct wreaths rivaling the most expensive and carefully constructed wreaths heretofore available. An annular disc member in the approximate shape of the wreath to be constructed is provided with a spirally-wrapped elastic band extending around its entire outer surface area. Small evergreen branches and sprigs are stuck between the elastic band and the annular disc around its outer surface to give the appearance of a conventional wreath woven of evergreen branches. Holes are provided in the annular disc to receive conventional nails which project through the disc to receive fruit or other objects impaled thereon. A composite structure of greater thickness and fuller appearance may be made by providing a second annular disc of similar construction fastened in spaced relationship from the first disc by means of short lengths of wire or string, the branches and sprigs acting as spacing members.

BRIEF DESCRIPTION OF THE DRAWINGS

FIG. 3 is an exploded perspective view of a composite wreath form in which two of the annular discs are utilized in the fashion illustrated in FIG. 2.

DESCRIPTION OF A PREFERRED EMBODIMENT

Figure 1:
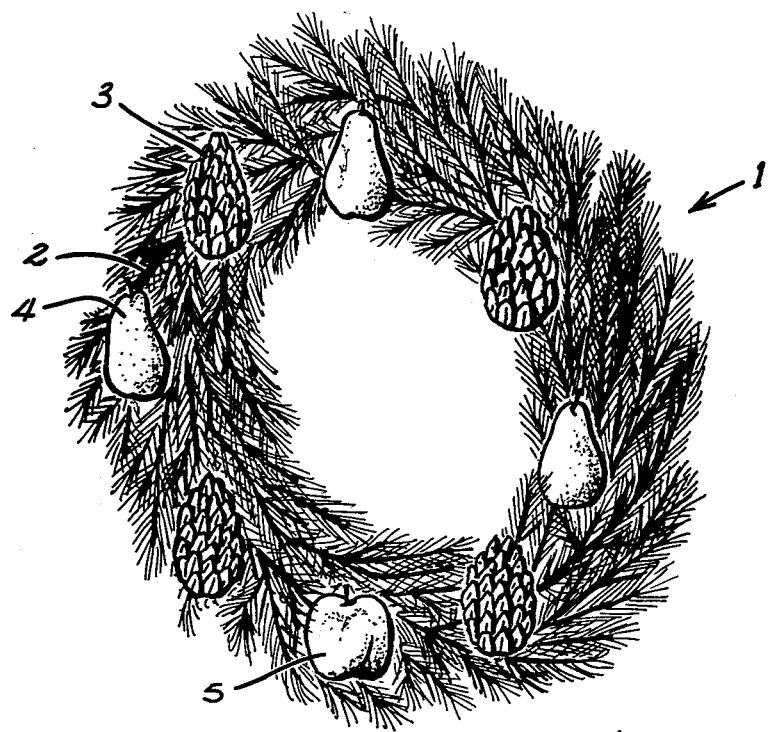
FIG. 1 is a perspective view of a decorative wreath constructed in accordance with features of the invention.

The invention will be described in connection with the preferred embodiment shown in FIGS. 1 to 3 of the drawing. A decorative wreath is shown and indicated generally by the numeral 1. The outer surface of the wreath is covered with greenery such as evergreen branches or sprigs indicated, for example, by the numeral 2. A plurality of decorative objects such as pine cone 3, pear 4, and apple 5 may be positioned to make a fruit wreath commonly referred to as a Della Robbia.

Figure 2:
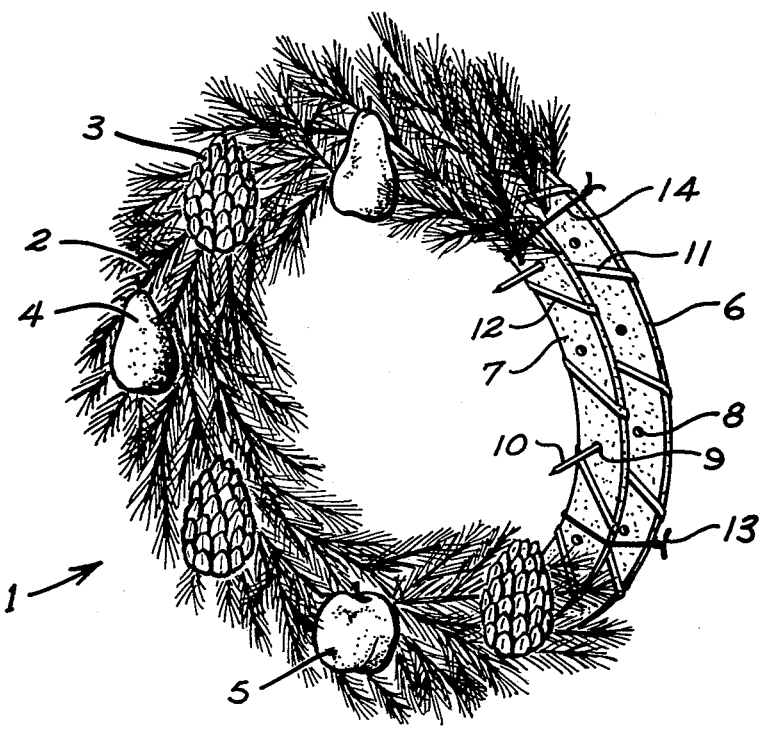
FIG. 2 is a view similar to that shown in FIG. 1 in which a portion of the wreath is broken away to show the structure underneath holding the evergreen branches and pieces of fruit in position.

The construction of the wreath will be understood more readily by referring to FIGS. 2 and 3 which show the basic form as used in a composite wreath. Although a composite wreath is shown to be made up of two forms tied together, it will be appreciated that the wreath can comprise a single form when there is no requirement for the full and thick appearance produced by two forms. In some instances it may even be desirable to use more than two forms where extra depth and fullness are required.

The basic form for wreath construction is an annular disc such as disc members 6 and 7 shown in FIGS. 2 and 3. In a typical wreath structure the annular disc may be anywhere from 12 inches to 20 inches in diameter, ¼ inch thick, and have an annular width varying from 1 inch to 3 inches. The materials used to construct the disc may be a roughly textured plastic or rough plywood. It is essential that the surface of the disc members have a sufficient coefficient of friction so that the twigs and branches held between the elastic band and the disc surface will not fall out or move about once the desired arrangement has been made. In order to increase the friction the elastic band is preferably at least ¼ inch in width.

Annular disc members 6 and 7 are provided with a plurality of holes spaced about 2 inches apart such as shown at 8 and 9. These holes are designed to receive conventional nails as shown at 10 to project therethrough and have fruit and other objects impaled thereon. The annular discs 6 and 7 are provided with elastic bands 11 and 12 which extend around the entire surface areas of the discs. The spirally wrapped elastic bands completely encircle the forms and allow the edges of the form to be completely covered and hidden by the greenery. The spiral wrappings are spaced about 1 inch apart. Even the rear surface of the form can be utilized for decorative material — a feature which is desirable when the wreath is to be hung in a window or other location which exposes to view both the front and rear surfaces of the wreath.

Construction of a wreath with the form provided by the present invention is a simple process. Greenery can be inserted under the spiral elastic bands anywhere on the annular disc member. By working continuously in one direction around the annular disc each piece of greenery is made to overlap the preceding piece thereby completely hiding the elastic band and the stem and branch positions which have no foliage. When constructing a composite wreath, it is usually desirable to insert the greenery under the elastic bands near the edges of the bottom annular disc 6, leaving the center portion mostly vacant. A second and somewhat narrower annular disc 7 can then be mounted in a superposed concentric relationship with the bottom disc and held in position by means of covered wires, plastic ribbons, tape or pieces of string such as shown at 13 and 14. The top disc 7 helps in securing the greenery already in place on the bottom disc 6 and allows more greenery to be added, thereby producing a thicker and fuller appearance.

What is claimed is:

1. A composite form for decorative wreaths comprising
   a first annular disc member having a surface whose coefficient of friction is sufficient to inhibit the movement of twigs and branches held thereagainst,
   a second annular disc member having a surface similar to said first annular disc member,
   said second disc member being narrower than said first disc member, a first elastic band spirally wound about the surface of said first disc member, whereby evergreen branches and sprigs may be inserted between the elastic band and surface of the disc member, a second elastic band spirally wound about the surface of said second disc-member, whereby evergreen branches and sprigs may be inserted between the elastic band and surface of the disc member; and means for fastening together said first and second disc members in a superposed concentric relationship, whereby more and larger evergreen branches may be added and held between the superposed disc members to produce a composite wreath having a thicker and fuller appearance as compared to the individual disc members.

2. The combination according to claim 1 wherein said annular disc members have a plurality of holes for receiving nails which project therethrough and on which decorative objects such as fruit can be impaled and positioned to form a Della Robbia.

* * * * *